United States Patent [19]

Fisher et al.

[11] 3,877,055

[45] Apr. 8, 1975

[54] SEMICONDUCTOR MEMORY DEVICE

[75] Inventors: John Andrew Fisher; Michael William Powell, both of Mesa, Ariz.

[73] Assignee: Motorola, Inc., Franklin Park, Ill.

[22] Filed: Apr. 12, 1974

[21] Appl. No.: 460,391

Related U.S. Application Data

[63] Continuation of Ser. No. 306,093, Nov. 13, 1972, abandoned.

[52] U.S. Cl. ....................... 357/23; 357/41; 357/54; 307/304

[51] Int. Cl. ............................................ H01l 11/14

[58] Field of Search ........... 357/23, 41, 54; 307/304

[56] References Cited

UNITED STATES PATENTS 3,436,622 4/1969 Warner, Jr. ......................... 317/235

3,719,866 3/1973 Naber ............................ 317/235 R

*Primary Examiner*—Martin H. Edlow

*Attorney, Agent, or Firm*—Vincent J. Rauner; Kenneth R. Stevens

[57] ABSTRACT

A fixed threshold MNOS device and a variable threshold MNOS device internally connected in series with a diffused area in the substrate, having a conductivity type opposite that of the substrate, in contact with both of the devices to provide a common source-drain. The diffused area forming the common source-drain is added to remove variations in channel length in the devices.

7 Claims, 10 Drawing Figures

SEMICONDUCTOR MEMORY DEVICE

This is a continuation, of application Ser. No. 306,093, filed Nov. 13, 1972 now abandoned.

BACKGROUND OF THE INVENTION

1. Field of the Invention

The present invention pertains to metal nitride oxide semiconductor device (MNOS). It has been found that a thin layer of metal oxide beneath a layer of metal nitride under the metal gate electrode of an MOS device traps charge with the result that a non-volatile memory unit is produced. This memory unit has steady state hysteresis properties in that a large negative voltage impressed on a typical P channel device changes its characteristic turn-on voltage level and an equally large positive voltage restores the original condition. Thus the MNOS device can be utilized as a memory unit which is presettable to a logical one or zero condition and which retains this preset condition practically indefinitely.

2. Description of the Prior Art

In the prior art an electrically alterable MNOS device and a non-alterable MNOS device are constructed on a single chip in series to form a single memory unit. The unalterable MNOS device is utilized to provide an address for the alterable MNOS device, which is the memory by means of controlling the current flowing in the alterable MNOS device and is utilized to increase the breakdown voltage of the composite device. The device consists of two spaced apart P-type diffusion regions in an N-type silicon substrate, the diffusion regions having metal source and drain ohmic contacts thereto, respectively, and a metal gate electrode therebetween with a portion of the metal gate electrode (extending approximately from one diffusion area to a line midway between the diffusion areas) having thereunder a relatively thin layer (approximately 30 angstroms) of silicon dioxide overlying the substrate and a thicker layer of silicon nitride overlying the silicon dioxide layer and the remaining portion of the gate (between the opposite diffusion area and the line midway therebetween) having thereunder a relatively thick layer (approximately 300 angstroms thick) of silicon dioxide overlying the substrate and a thick layer of silicon nitride overlying the layer of silicon dioxide. The portion of the gate electrode having the thin layer of silicon dioxide thereunder forms the gate for the electrically alterable MNOS device and the portion of the gate electrode having the relatively thick layer of silicon dioxide forms the gate for the electrically non-alterable MNOS device. Since the overall area of the gate determines the conductive resistance in each of the devices, any variation in the channel length of either of the devices (the distance from the depletion layer to the junction of the two gates) will vary the conductive resistance of either of the devices, unless the width of the channel is varied accordingly.

In the prior art devices first and second gate masks are utilized in the production thereof and the inherent misregistration of the gate masks can introduce a plus or minus 1/10 mil variance in the channel length of either of the two series connected devices in addition to normal diffusion variations. Further, the junction of the two gates is not a well defined line and overlies the active substrate so that electrical variations in the channel length, or end effects, are produced. Thus, the overall channel width of the series devices must be increased to compensate for the worst case of the channel length variance. This variation in channel length and increase in channel width is highly undesirable because of component to component variations in production. Further, the size of the components is increased somewhat because of the required increase in channel width.

SUMMARY OF THE INVENTION

The present invention pertains to an improved semiconductor memory device of the type wherein a fixed threshold MNOS device and a variable threshold MNOS device are internally connected in series and includes an area diffused into the substrate having a conductivity opposite that of the substrate and contacting the silicon dioxide layers in the gates of both devices to form a common source-drain therebetween. This common source-drain removes the channel length variation caused by mask misregistration in each of the series connected devices and thereby allows minimal channel width for a specified conductive resistance in the series devices. Further, the incorporation of the common source-drain serves to standardize the component to component characteristics during production.

It is an object of the present invention to provide an improved semiconductor memory device.

It is a further object of the present invention to provide an improved semiconductor memory device of the type including a fixed threshold MNOS device and a variable threshold MNOS device internally connected in series and having the improvement incorporated therein of a common source-drain.

It is a further object of the present invention to provide an improved semiconductor memory device which can be produced with relatively standard characteristics and with a minimum gate channel width.

These and other object of this invention will become apparent to those skilled in the art upon consideration of the accompanying specification, claims and drawings.

BRIEF DESCRIPTION OF THE DRAWINGS

Referring to the drawings, wherein like characters indicate like parts throughout the FIGS.

DESCRIPTION OF THE PREFERRED EMBODIMENT

Figure 1:
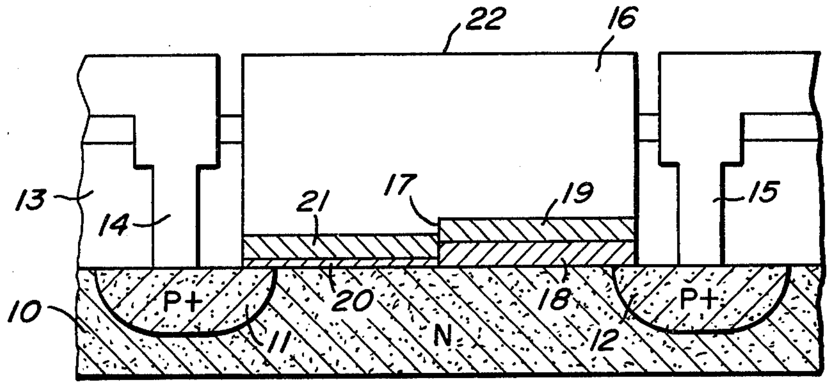
PRIOR ART FIG. 1
FIG. 1 is a cross-sectional view of a prior art structure.

Referring specifically to FIG. 1, a cross-sectional view of a prior art structure is illustrated wherein a substrate 10 of N-type conductivity silicon has two, spaced apart P-type conductivity areas 11 and 12 diffused therein from the upper surface. A very thick layer 13 of silicon dioxide, or insulating material, is formed over the upper surface of the substrate 10. Two relatively small openings 14 and 15 are formed in the layer 13 in overlying relationship to the diffused areas 11 and 12, respectively, and a large centrally located opening 16 is formed in the layer 13 approximately midway between the two smaller openings 14 and 15. The openings 14 and 15 are filled with a metal contact material which forms an ohmic contact with the diffused areas 11 and 12 and provides source and drain contacts, respectively, for the composite device. The central opening 16 is divided approximately midway at a line 17. The portion of the central opening 16 between the line 17 and the edge of the layer 13 overlying the diffused area 12 has a first relatively thick layer 18 of silicon dioxide overlying the substrate 10, which layer 18 is in turn covered by a relatively thick layer 19 of silicon nitride. The remaining portion of the opening 16 between the line 17 and the edge of the layer 13 overlying the diffused area 11 has a first relatively thin layer 20 of silicon dioxide overlying the substrate 10, which layer 20 is in turn covered by a relatively thick layer 21 of silicon nitride. A layer 22 of metal contact material is positioned in overlying relationship to the silicon nitride layers 19 and 21 and forms an ohmic contact therewith to provide a gate contact for the composite device.

In the construction of the prior art device illustrated in FIG. 1, the substrate 10 is masked to diffuse the areas 11 and 12 therein after which the remaining layers are formed on the upper surface thereof. During the formation of the upper layers the position of the line 17, or junction of the layers 18 and 20, determines the length of the gate channel for each of the series connected devices. It can be seen that the accuracy of positioning the opening 16 relative to the diffusion areas 11 and 12 and the positioning of the line 17 during the formation of the layers 18 and 20 can greatly affect the channel length of each of the devices, or the distance between the line 17 and the adjacent edges of each of the diffusion areas 11 and 12. It has been determined that this variation can be as much as plus or minus 1/10 mil.

Figure 2:
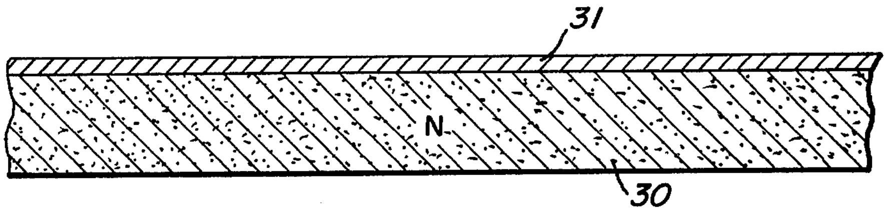
FIGS. 2–10 illustrate progressive steps in the production of an improved semiconductor memory device according to the present invention.
Figure 3:
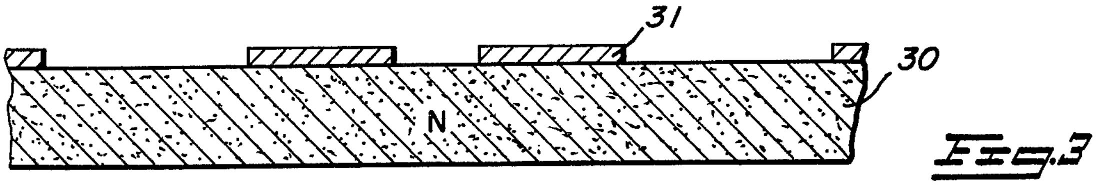
Figure 4:
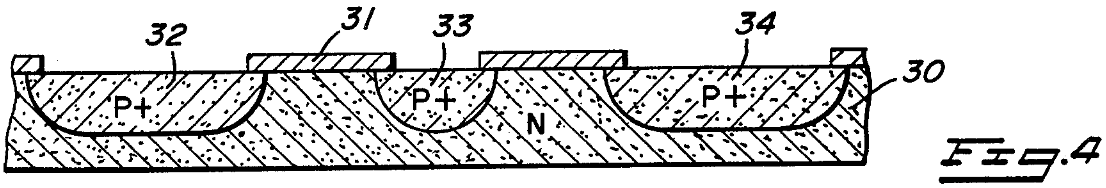

Referring to FIGS. 2 through 10, cross-sectional views of an embodiment of the improved device in the various steps of production are illustrated. FIG. 2 illustrates a substrate 30 of N-type conductivity with a silicon dioxide layer 31 grown on the upper surface thereof. Referring to FIG. 3, three spaced apart openings are formed in the silicon dioxide layer 31 and, as illustrated in FIG. 4, three diffused areas 32, 33 and 34, all having P-type conductivity, are formed in the substrate 30 through the openings in the layer 31 by utilizing any of the well known diffusion methods. It should be understood that the silicon substrate 30 and the specific types of conductivity described are utilized for exemplary purposes and other materials and/or reversed conductivities might be utilized by those skilled in the art.

Figure 5:
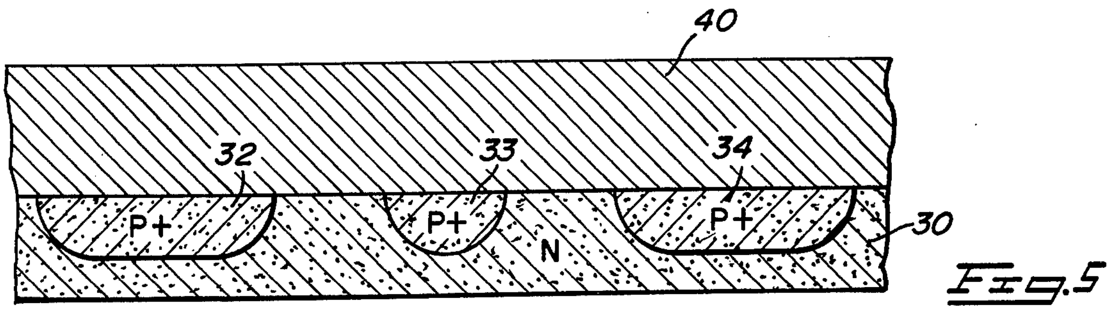
Figure 6:
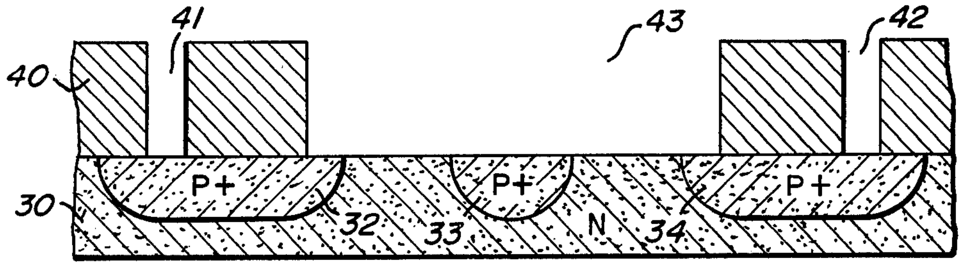
Figure 7:
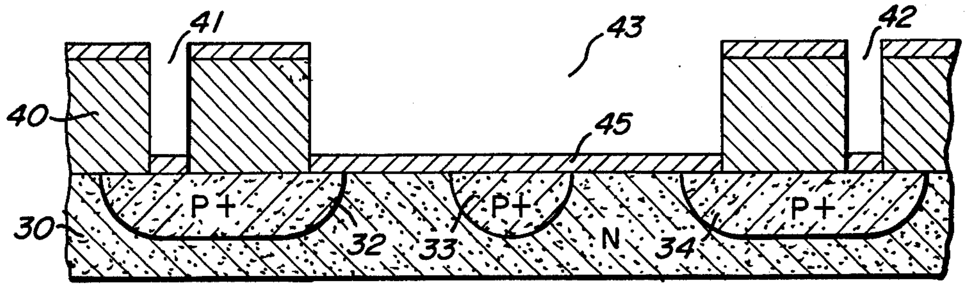
Figure 8:
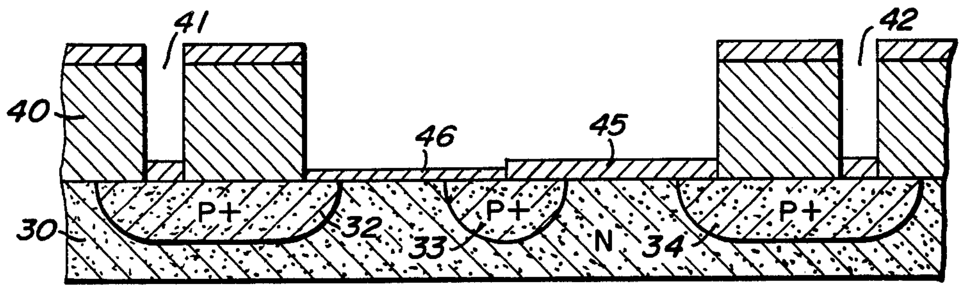

After the diffusion of the three areas, 32, 33 and 34 into the substrate 30, the silicon dioxide layer 31 is removed and a relatively thick layer 40 of insulating material, such as silicon dioxide, is formed on the upper surface of the substrate 30 (see FIG. 5). Portions of the layer 40 of insulating material are then removed to provide an opening 41 overlying a generally centrally located portion of the diffused area 32, an opening 42 overlying a generally centrally located portion of the diffused area 34 and a substantially larger opening 43 positioned between the openings 41 and 42 and exposing all of the diffused area 33, portions of the diffused areas 32 and 34 and the substrate therebetween (see FIG. 6). It should be understood that the openings 41, 42 and 43 may have substantially any configuration, depending upon the top plan of the device being produced, and the name "openings" is utilized simply for ease of description. A layer 45 of silicon dioxide is grown on the exposed surface of the substrate 30 in at least the opening 43. In the present method the layer 45 is grown over all of the exposed substrate in the openings 41, 42 and 43 for ease of production (see FIG. 7) and the silicon dioxide in the openings 41 and 42 is later removed, as will be explained presently. The layer 45 is a relatively thick layer in the range of approximately 300 to 500 angstroms thick.

The layer 45 of silicon dioxide is removed from approximately a line centrally overlying the diffused area 33 to the inner edge of the insulating layer 40 overlying the diffused area 32. Thus, a portion of each of the diffused areas 32 and 33 and the silicon substrate therebetween is exposed by the removal of that portion of the layer 45. A second relatively thin layer 46 of silicon dioxide is grown in the exposed area described above (see FIG. 8). The layer 46 should have a thickness less than 50 angstroms and preferably in the range of 20 to 30 angstroms. It should be understood that metal oxides other than silicon dioxide might be utilized to form the layers 45 and 46 but silicon dioxide is described in the present embodiment because of its ease of formation.

Figure 9:
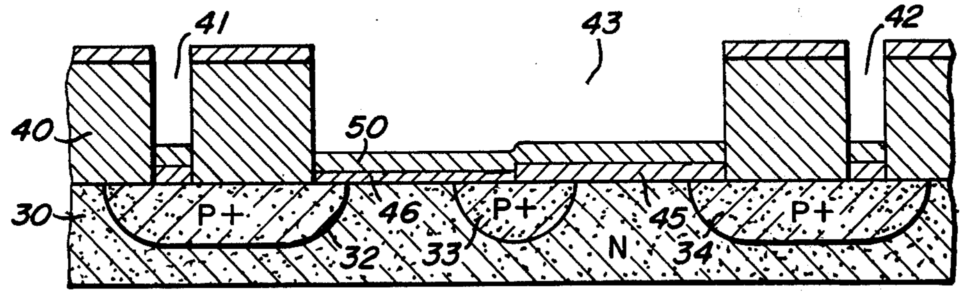
Figure 10:
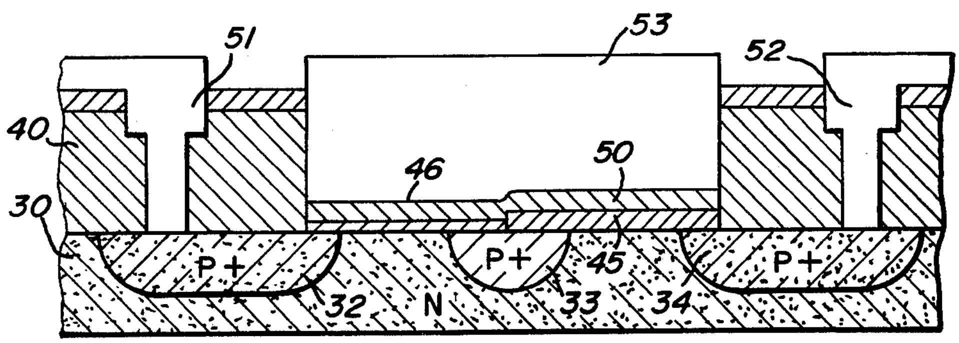

Referring to FIG. 9, at least the layers 45 and 46 are covered with a relatively thick layer 50 of metal nitride, which in this embodiment is silicon nitride ($Si_3N_4$) because of its ease in formation. In the present process, as illustrated in FIG. 9, the entire device is coated with the silicon nitride layer 50 to simplify the application thereof. Any portion of the silicon dioxide layer 45 and the silicon nitride layer 50 formed in the openings 41 and 42 is then removed to expose the diffused areas 32 and 34. A metal contact layer 51 (see FIG. 10) is formed in the opening 41 in ohmic contact with the diffused area 32 to operate as an external source electrode of the composite device. Similarly, a metal contact layer 52 is formed in the opening 42 in ohmic contact with the diffused area 34 to operate as an external drain electrode of the composite device. A layer 53 of metallic contact material is positioned in the opening 43 in overlying relationship to the silicon nitride layer 50 and in ohmic contact therewith to operate as a gate electrode.

Thus, the diffused area 33 positioned beneath the adjacent edges of the silicon dioxide layers 45 and 46 operates as a common source-drain. The relatively thick layer 45 of silicon dioxide lying between the diffused areas 33 and 34 defines the gate of the fixed threshold MNOS device and the relatively thin layer 46 of silicon dioxide lying between the diffused areas 32 and 33 defines the gate of the variable threshold MNOS device. The channel length of each of the MNOS devices is defined by the length of N-type conductivity substrate 30 between the diffused areas 32–33 and 33–34. Since the diffused areas 32, 33 and 34 are formed in the substrate 30 by a single mask (FIG. 3) the distance therebetween can be held to a very close tolerance. Further, since the channel length is defined by the distance between the diffusion areas 32–33 and 33–34, the exact position of the junction of layers 45 and 46 is not critical, as long as it overlies the diffusion area 33. Thus, an improved semiconductor memory device is described comprising a fixed threshold MNOS device and a variable threshold MNOS device internally connected in series, each having relatively constant channel lengths and, therefore, minimum channel widths. Also, variations in channel length due to end effect are eliminated because the junction, line 17, of the two devices lies over the diffusion area rather than the active substrate. Further, because the channel lengths are constant and the widths are minimum the characteristics of the devices can be maintained relatively constant.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. An improved semiconductor memory device comprising:

a. a substrate having a first type of conductivity;

b. at least first, second and third diffusion areas located in spaced apart relationship in said substrate and having a conductivity type opposite that of said substrate;

c. alterable threshold gate means including a first relatively thin layer of metal oxide disposed in contact with said first and second diffusion areas and said substrate therebetween and a second layer of metal nitride disposed over said thin layer of metal oxide;

d. fixed threshold gate means including a first relatively thick layer of metal oxide disposed in contact with said second and third diffusion areas and said substrate therebetween and a second layer of metal nitride disposed over said thick layer of metal oxide, said thin layer of metal oxide and said relatively thick layer of metal oxide being contiguous to each other at an interface, said second diffusion region being disposed in said substrate and at least a portion thereof being located under said interface;

e. first and second ohmic contact means disposed in contact with said first and said third diffusion areas, respectively; and f. a single gate electrode means disposed in contact with both said alterable and fixed threshold gates.

2. An improved semiconductor memory device as claimed in claim 1 wherein said metal oxide includes silicon dioxide.

3. An improved semiconductor memory device as claimed in claim 1 wherein said metal nitride includes silicon nitride.

4. An improved semiconductor memory device as claimed in claim 1 wherein said substrate has an N-type conductivity and the first, second and third diffusion areas each have a P-type conductivity.

5. An improved semiconductor memory device as claimed in claim 1 wherein the relatively thin layer of metal oxide is less than 50 angstroms thick.

6. An improved semiconductor memory device as claimed in claim 1 wherein the relatively thin layer of metal oxide is in the range of 20 to 30 angstroms thick.

7. An improved semiconductior memory device as claimed in claim 1 wherein the relatively thick layer of metal oxide is in the range of approximately 300 to 500 angstroms thick.

* * * * *